Sept. 23, 1952     D. C. LUDWIG ET AL     2,611,629
FENDER AND FENDER SHIELD ASSEMBLY
Filed Jan. 25, 1949     3 Sheets-Sheet 3
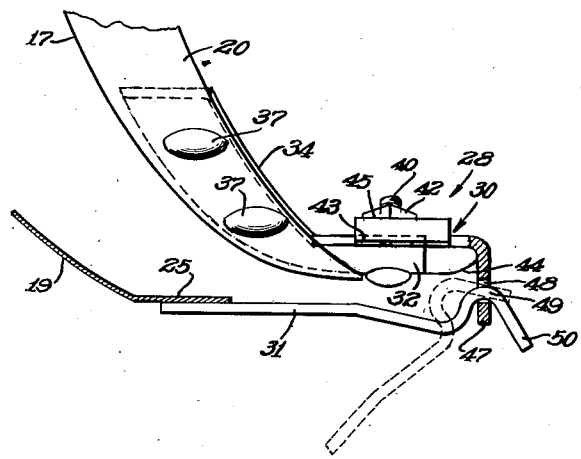
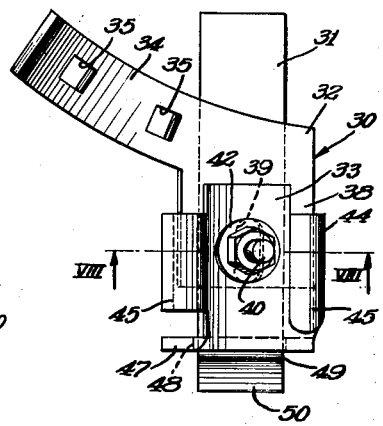
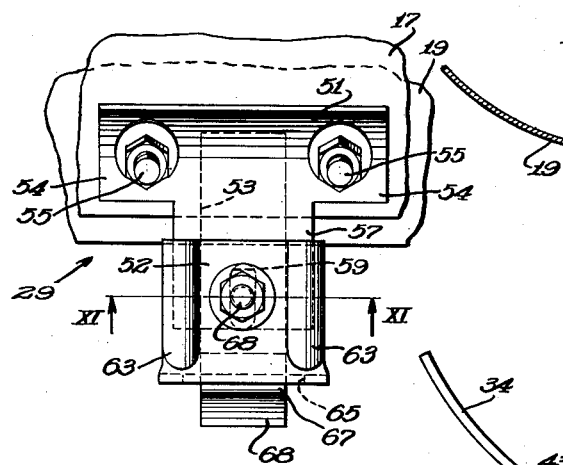
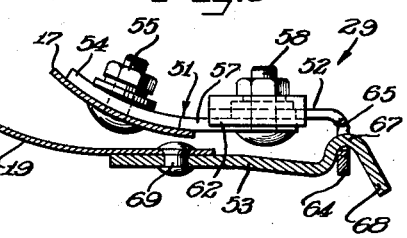
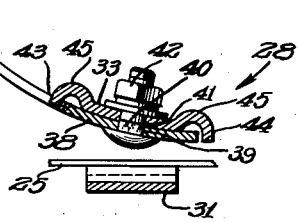
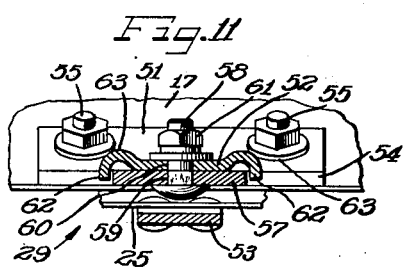
Inventor
Donald C. Ludwig
George W. Schatzman Patented Sept. 23, 1952

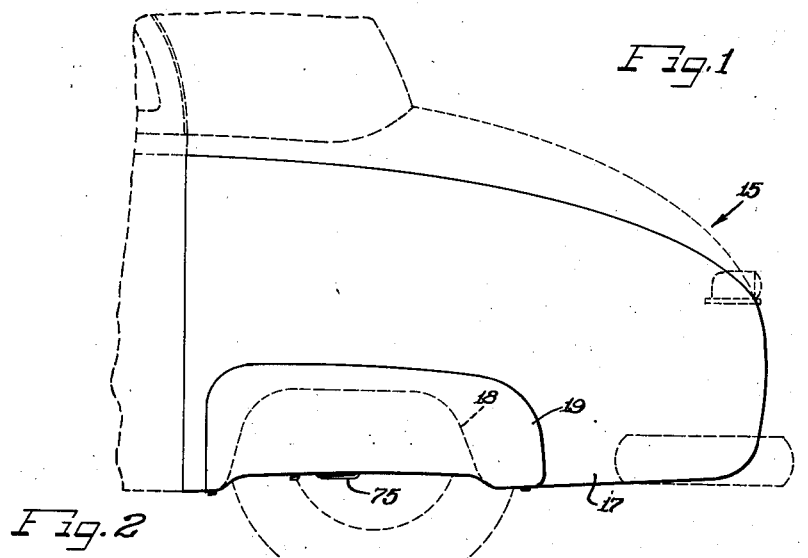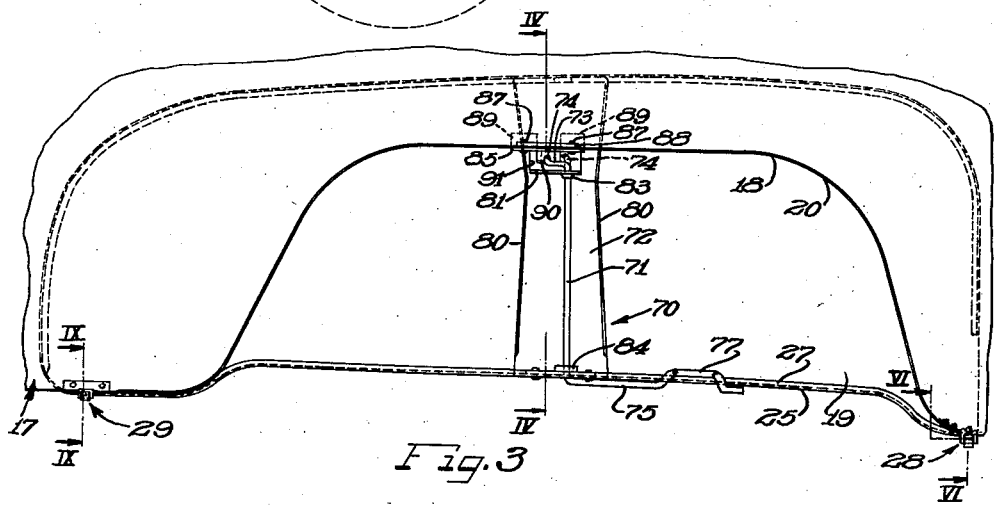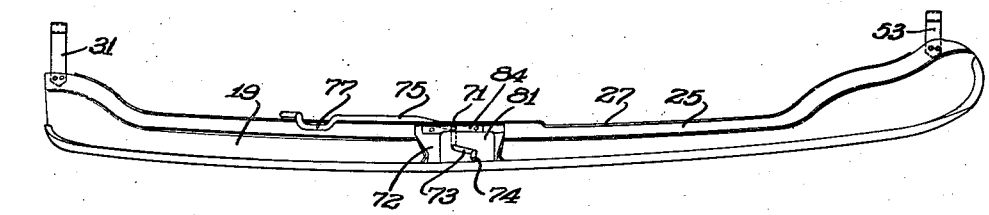

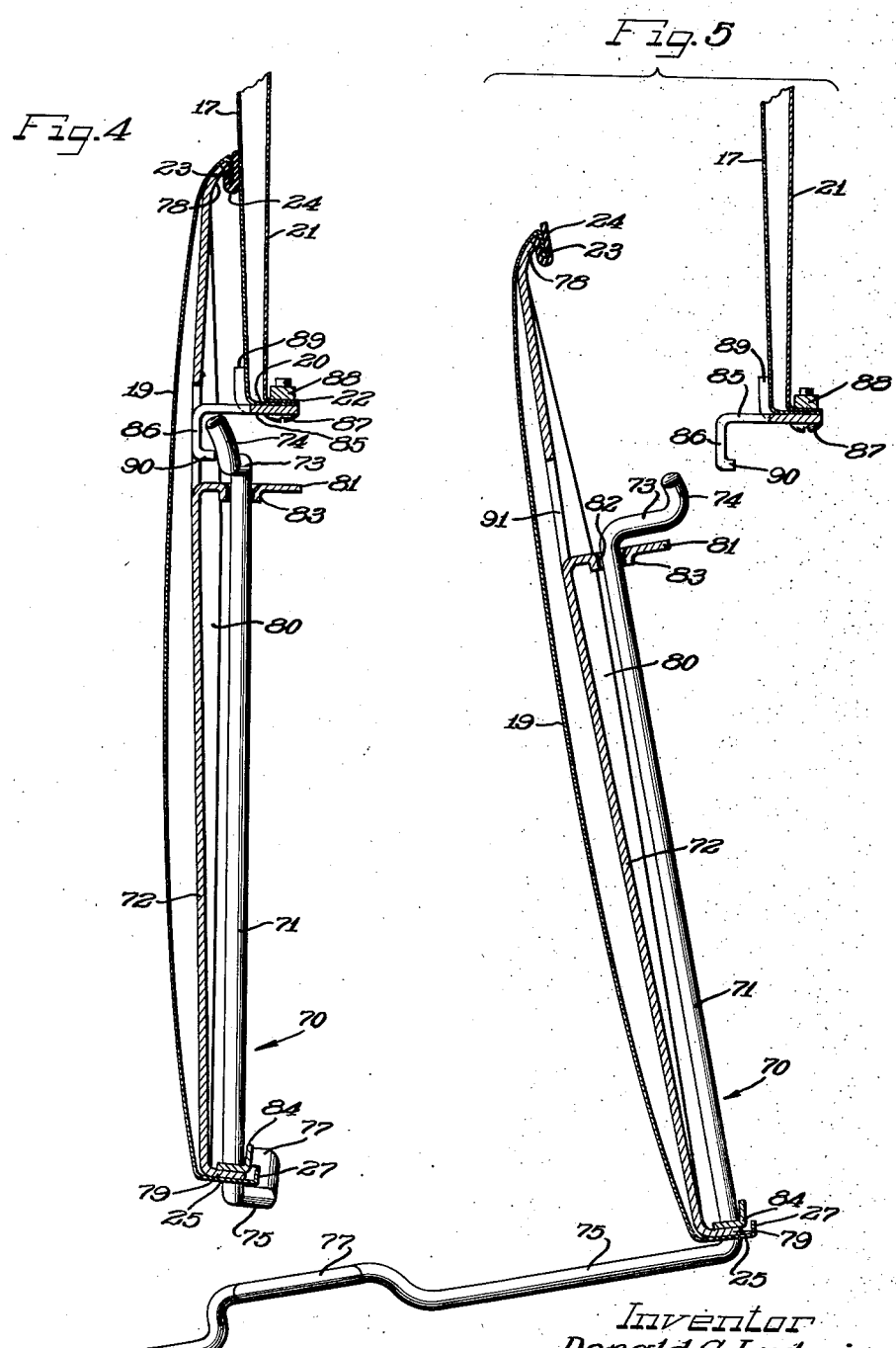

2,611,629

UNITED STATES PATENT OFFICE 2,611,629

FENDER AND FENDER SHIELD ASSEMBLY

Donald C. Ludwig and George W. Schatzman, Detroit, Mich., assignors to Houdaille-Hershey Corporation, Detroit, Mich., a corporation of Michigan Application January 25, 1949, Serial No. 72,662

12 Claims. (Cl. 280—153)

The present invention relates to improvements in fender and fender shield assemblies, and more particularly to such an assembly including novel means for attaching the fender and fender shield together.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in an axial direction. Since this opening inherently presents an unattractive outward appearance and in high speed operation is an air turbulence factor, detachable fender shields have been employed to cover the opening protectively and ornamentally.

As the term "fender shield" shall hereinafter be employed, it refers to any member which is adapted to be secured to a fender or other portion of a vehicle body for the purpose of covering the opening in the fender or vehicle body and which opening is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body and whether or not it projects outwardly from the principal body portion of the vehicle.

An important object of the present invention is to provide a novel fender and fender shield assembly in which the fender shield is mounted upon and removably attached to the fender in a novel manner.

Another object of the invention is to provide a novel fender and fender shield assembly in which the attaching means at the center portion of the fender shield is especially adapted for situations where there is only small clearance between the fender and the fender shield and the wheel substantially enclosed thereby.

A further object of the invention is to provide improved means for attaching a fender and fender shield together.

Still another object of the invention is to provide improved latching structure for attaching a fender shield in operative position on a fender.

A further object of the invention is to provide improvements in the means for attaching the ends of a fender shield to a fender.

A still further object of the invention is to provide new and improved means whereby a fender shield is adapted to be mounted securely and efficiently in a simple and easily understood manner and so that it can be conveniently handled by relatively inexperienced persons.

Other objects, features and advantages of the present invention will be readily apparent from the following detailed description of a preferred embodiment thereof taken in conjunction with the accompanying drawings, in which:

Figure 1 is a side elevational view of a fender and fender shield assembly embodying the features of the present invention and showing the same associated, more or less schematically, with a vehicle wherein the assembly is adapted to be used.

Figure 2 is an enlarged fragmentary inside elevational view of the fender and fender shield assembly.

Figure 3 is a top plan view of the fender shield.

Figure 4 is an enlarged vertical sectional detail view taken substantially on the line IV—IV of Figure 2.

Figure 5 is a vertical sectional view like Figure 4 but showing the fender shield in process of being either mounted or removed.

Figure 6 is an enlarged fragmentary sectional detail view taken substantially on the line VI—VI of Figure 2 and showing how the forward end portion of the fender shield is mounted with respect to the fender.

Figure 7 is a top plan view of the front end mounting bracket assembly.

Figure 8 is a sectional detail view taken substantially on the line VIII—VIII of Figure 7.

Figure 9 is a sectional detail view on an enlarged scale taken substantially on the line IX—IX of Figure 2 and showing details of the rear end mounting of the fender shield.

Figure 10 is a top plan view of the rear end fender shield mounting structure; and Figure 11 is a sectional detail view taken substantially on the line XI—XI of Figure 10.

The present invention is especially useful for automobiles of the more recent trend in styling and in which the rear fenders are substantially or actually part of the body lines. One of the features of this styling is a lowering of the wheel access opening. Clearance between the upper margin defining the wheel access opening and the side of the wheel may therefore be quite limited. An automobile 15 in which these conditions prevail is represented in Figure 1 and includes a rear fender 17 having a wheel access opening 18 which is ornamentally and protectively closed by a fender shield 19. As best seen in Figs. 3 and 4 the margin of the shield defining the wheel access opening 18 has an inturned reinforcing flange 20. An inner wheel house structure 21 serving as a spaced protective liner or shield for the fender wall may also be present and has an inturned flange 22 resting upon the fender flange 20.

According to the present invention, the fender shield 19 is of the type which overlaps the outer face of the fender 17 about the wheel access opening 18 and is supported at its opposite ends by the fender while a more or less centrally located latching mechanism completes the attachment of the fender shield to the fender. To this end, the fender shield comprises a panel which may be formed from sheet metal and with the edges reinforced by marginal flanges, the upper and end edges having a return bent flange 23 adapted in assembly to lie substantially parallel to the face of the fender and carrying a resilient rubber or rubber-like cushioning and sealing gasket strip 24 embracing the same and having a portion which in assembly is interposed under compressive force between the flange 23 and the face of the fender. At its bottom edge, the fender shield 19 is provided with an inturned generally horizontal reinforcing flange 25 formed with an upstanding inner terminal flange 27.

Means are provided for mounting the opposite ends of the fender shield adjacent to the respective opposite ends of the wheel access opening 18 and in a manner to enable the connection of the fender shield to the fender first at its ends and then rocking of the fender shield inwardly into full engagement with the fender. For this purpose, the front end portion of the fender shield is attached to and supported upon the fender through the medium of a bracket assembly 28, while the rear end of the fender shield is attached to and supported upon the fender through the medium of a bracket assembly 29.

Having special reference to Figures 2 and 6, the front end bracket assembly 28 comprises an adjustable bracket portion or unit 30 carried by the fender and an engageable bracket portion or member 31 carried by the fender shield. The fender carried bracket portion 30 comprises an assembly including a body plate member 32 secured to the fender and a hanger plate member 33 carried adjustably by the body member 32. The body member 32 is constructed to be secured to the reinforcing flange 20 of the fender and for this purpose includes a lateral tail portion or extension 34 formed with a pair of square apertures 35 receptive of square shoulders on attachment bolts 37 by which the bracket body is secured on top of the fender flange 20 (Figs. 6 and 7). Projecting inwardly on the bracket body 32 is a supporting ledge or projection portion 38 upon which the body portion of the adjustable hanger member 33 is carried. An aperture 39 in the bracket member 33 accommodates an attachment bolt 40 which extends through an aperture 41 in the supporting extension 38 and carries a nut 42 by which it is adapted to be tightened to secure the members 32 and 33 together. Longitudinal adjustment of the hanger member 33 to any preferred inwardly extending position is permitted by having one of the bolt apertures, herein the aperture 41 longitudinally elongated.

To retain the hanger bracket member 33 against turning about the axis of the bolt 40, turn-preventing means are provided herein comprising downturned side marginal flanges 43 and 44 (Fig. 8) spaced apart for free slidable engagement with the side edges of the supporting portion 38 of the carrying bracket member. These side flanges preferably join the body of the hanger bracket member 33 through the medium of respective longitudinal reinforcing ribs 45.

Depending from the inner end of the body of the hanger plate 33 is a downturned hanger flange extremity portion 47 which is formed with a generally horizontally elongated eye slot 48 for interengaging reception of the fender shield carried bracket member 31. To this end, the bracket member 31 is in the form of an elongated metal plate or strip secured as by welding flatwise against the fender shield lower marginal flange 25 and extending inwardly to underlie the adjacent lower edge of the fender and engage within the hanger bracket eye slot 48. For efficient interengagement with the hanger bracket an upwardly arched downwardly opening hook formation 49 is formed adjacent to the inner end of the bracket finger 31 while the extremity portion at the inner side of the hook is in the form of an oblique inwardly and downwardly extending terminal flange 50.

As best seen in Fig. 6, when the fender shield is to be mounted upon the fender, it is lifted in an outwardly tilted position to bring a lower margin thereof adjacent to the lower margin of the fender and the bracket finger extremity 50 is introduced into the hanger eye 48 substantially as shown in dash outline. After the extremity 50 has been fully inserted within the eye, the fender shield can be rocked up into engagement with the fender, the bight of the hook 49 riding trunnion-like upon the hanger bar of the hanger flange 47 defining the lower side of the eye opening. The sloping finger extremity 50 serves as a cam functioning under the weight of the fender shield to draw the lower front end portion of the fender shield inwardly toward the fender to the extent permitted by full engagement of the hook upon the hanger bar. Optimum results in this respect are attained by proper adjustment of the hanger member 33 on the carrying plate 32 by loosening the bolt 40 and after proper adjustment tightening the same to maintain the bracket assembly in the adjusted service condition.

The rear supporting and attachment bracket assembly 29 is functionally like the front bracket assembly 28 with certain modifications better adapting the same for the particular structure of the rear portion of the fender. To this end, having reference to Figs. 2, 9 and 10, the bracket assembly 29 comprises an upper supporting bracket member or plate 51 carrying an adjustable hanger plate or member 52 and connected to the fender while a lower bracket plate or finger 53 is carried by the fender shield and is engageable with the hanger member 52. The bracket plate 51 preferably comprises a generally T-shape plate structure having lateral ears 54 which are appropriately apertured for attachment to the lower margin of the fender by means of bolts 55. A forward central supporting extension 57 extends inwardly beyond the edge of the fender and carries the hanger bracket member 52.

Inward longitudinal slidable adjustment of the hanger plate bracket member 52 is afforded by attachment thereof to the supporting extension 57 by means of a bolt 58 having a square intermediate shoulder engaging within a square aperture 59 in the extension 57 and projecting up through a longitudinally elongated slot 60 in the hanger plate member 52, a nut 61 being threaded thereon for tightening the assembly (Fig. 11). Turning of the hanger plate 52 about the axis of the bolt 58 is prevented by means such as longitudinal side edge downwardly extending flanges 62 opposing the side edges of the supporting extension 57. Longitudinal marginal ribs 63 reinforce the hanger plate 52.

At its inner extremity the hanger bracket plate 52 has a downturned bracket flange 64 provided with a horizontal slot 65 for reception of the bracket finger plate 53 carried by the fender shield. For this purpose the bracket finger 53 is formed with an innerengagement hook extremity portion 67 defined at its inner side by an oblique inwardly and downwardly extending terminal and cam flange 68. At its outer extremity, the bracket finger 53 is secured to the margin of the fender shield 19 in a suitable fashion as by means of rivets 69 although it may be welded on to the fender shield if desired. Assembly of the finger bracket member 53 with the hanger flange 64 is effected in the same manner as was described in connection with the front bracket assembly 28, and may be effected simultaneously therewith by proper maneuvering of the fender shield, although ample tolerance in the proportions of the elements is permitted so that if more convenient, one of the finger extremity flanges 50 or 68 may be inserted in its hanger bracket eye and then the other, and the fender shield then swung up into engagement with the fender.

After the fender shield has been rocked into substantial engagement with the fender, following interengagement of the end supporting and attachment brackets 28 and 29, a latching mechanism 70 preferably located substantially centrally on the fender shield 19 is operated to complete the attachment of the fender shield on the fender. This latching mechanism comprises a latching member 71 carried by a vertical reinforcing and stressing strut 72 mounted on the back of the fender shield.

The latching member 71 comprises a torsion rod extending vertically and having at its upper end a laterally extending latching head 73 provided with an upstanding arcuate latching and clamping terminal 74. The lower end portion of the latching rod 71 is formed to provide a laterally extending handle 75 projecting in opposite direction from the head 73 and formed adjacent its end with an upwardly and then horizontally extending interlock loop 77.

The strut 72 preferably comprises a sheet metal plate of heavier gauge than the fender shield panel and of a length to extend between the upper and lower marginal flanges of the fender shield, being provided at its upper end with an upper terminal flange 78 engaging behind the upper marginal flange 23 of the fender shield. At its lower end the strut is formed with an inturned foot flange 79 which rests upon the lower marginal flange 25 of the fender shield. Inwardly extending side flanges 80 on the strut afford reinforcement for stiffening the strut against bending intermediately.

For supporting the torsion latch rod 71 rotatably, the strut 72 is provided with an inwardly struck out ear 81 formed with a bearing aperture 82 defined by an annular reinforcing and bearing flange 83 projecting downwardly. The flange 83 provides a smooth bearing within which the upper end portion of the latch rod 71 is slidably rotatably journalled immediately under the latch head 73.

The lower end portion of the latch rod 71 is journalled in suitable apertures (not shown) in the lower flange 25 of the fender shield and the superimposed strut foot flange 79, and an angular retaining bar 84 secured upon the foot flange 79 and having a flange at the inner side of the latch rod retains the latch rod in the lower journal thus provided therefore. Through this arrangement, the latch rod 71 is adapted to be rotated about a generally horizontal axis, by manipulation of the handle 75, to swing the latch head 73 toward or away from the strut 72.

The construction and arrangement of the latching mechanism 70 is such that in the condition of full engagement of the fender shield with the fender, as best seen in Fig. 4, the latching head 73 lies below the fender flange 20 and outwardly of at least the inner edge of such flange to swing about the generally vertical axis of rotation of the latch rod 71 and which axis is located adjacent to the outer face plane of the fender 17. This is for the purpose of accommodating the latching mechanism to the rather close clearance between the fender and the wheel of the vehicle, and more especially to afford ample room for swinging of the latching head 73 to the nonlatching position as shown in full line in Fig. 5 and in dash line in Fig. 2.

In order to effect latching engagement with the fender 17, a generally hook-shaped bracket 85 is secured to the marginal flange 20 of the fender and projects outwardly so that a downwardly projecting and inwardly opening latch hook 86 thereon can be latchingly engaged by the latching terminal 74 of the latching rod. In an efficient form, the latching bracket 85 comprises a sheet metal plate secured to the underside of the fender flange 20 by means such as screws 87 threaded into a tap plate 88 superimposed upon the wheel house flange 22 and effective when drawn tight by the screws 87 to clamp the flanges 20 and 22 and retain the bracket plate 85 solidly in place. Any tendency toward canting of the bracket plate 85 upwardly at its hooked outer end as a result of clamping pressure thereagainst is resisted by a pair of upstanding flanges 89 which engage snugly against the outer face of the margin of the fender at the opposite sides of the bracket plate.

In order that the latching head 73 can clear the latching hook 86 in the nonlatching relationship, the latching hook is offset to one side of the axis of the torsion latching rod 71, as best seen in Fig. 2. In this way the fender shield can be swung by rocking the same on its lower end supporting brackets into and out of engagement with the fender and the latching head will ride past one side of the latching hook. When the fender shield is in engagement with the fender, the latching head 73 can be swung into the latching engagement with the latching hook 86 by manipulation of the handle 75 to cause the latching terminal 74 to engage within the latching hook and more particularly to engage cammingly with an inturned short terminal flange 90 at the lower end of the latching hook. As this occurs, the latching rod 71 is placed under torsional stress to draw the strut 72 and more particularly the upper end portion thereof inwardly and stress the upper margin of the fender shield against the fender to effect tight engagement thereof. Due to inherent resilience in the handle 75 it can then be sprung up behind the lower fender shield marginal flange 25 to engage the interlock loop 77 upon the upturned terminal flange 27. Thereby retaining the latching rod in the latching position.

In order to accommodate the outwardly projecting latching hook 86, the strut 72 is, in the present instance, provided with an opening 91 into which the hook may project in the fully mounted condition of the fender shield. This opening is formed by the striking out of the journal eye member or ear 81 which, for this purpose, is preferably formed wider than necessary for its journal or bearing function. That is, the ear member 81 is widened toward the side toward which the bracket hook 86 is offset relative to the axis of the torsion clamping rod 71 as best seen in Fig. 2.

In brief summary, mounting and removal of the fender shield 19 can be effected simply and quickly without the use of any tools, once proper adjustments have been made following installation of the attachment and supporting bracket structures on the fender. Hence, after the lower end bracket assemblies 28 and 29 have been installed and adjusted and the clamping hook bracket 86 has been installed on the fender, the fender shield can be mounted by the simple expedient of lifting it into outwardly tilted position relative to the fender and inserting the attachment and supporting bracket fingers 31 and 53 on the fender shield into the respective hanger flanges 47 and 64, rocking the fender shield up into substantially full engagement with the fender and then turning the handle 75 of the latching mechanism from the unlatched position shown in Figure 5 to the fully latched position shown in Figure 4. In the latter relationship, the clamping terminal head 74 cammingly bears against the hook terminal 90 or the downwardly extending portion of the hook 86 and through the action of the strut 72 draws the upper portion of the fender shield into snug tensioned engagement with the outer face of the fender. This condition is maintained by flexing the handle portion 75 behind the fender shield flange 25 and engaging the interlock loop 75 thereof over the terminal flange 27 to maintain the latched condition of the torsion rod 71.

Removal of the fender shield involves merely a reversal of the mounting process, namely releasing the handle 75 from the fender shield bottom flange, turning the handle to turn the torsion rod 71 and swing the latching head 73 inwardly to clear the latching hook 86, whereupon the fender shield can be rocked outwardly about its lower end bracket bearings, and the lower brackets disengaged and the fender shield lifted away. Since the latching head 73 is accommodated below the fender upper margin and in a space which actually extends outwardly beyond such fender margin, but inwardly of the fender shield, ample clearance for swinging of the latching head is afforded in spite of restricted clearance between the fender and the associated vehicle wheel assembly.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In combination in a fender and fender shield assembly, a fender having a wheel access opening and affording only restricted clearance between the margin defining the upper portion of the wheel access opening and an associated vehicle wheel structure, a fender shield closing said opening, means detachably supporting the lower end portions of the fender shield on the fender, a bracket member secured to said margin of the fender and including a generally hook-shaped portion projecting outwardly and downwardly beneath said margin, a vertical strut extending between and attached to the upper and lower margins at the inside of the fender shield, and a torsion rod latching member supported by said strut and including a lower operating structure engageable for operation below the lower margin of the fender shield for rotation of the latching rod and an upper latching head portion engageable with said hook-shaped bracket portion, the strut having an inwardly projecting bearing structure thereon located in spaced relation below said bracket and said latching rod being journalled in said bearing structure below said latching head with the head swingable into and out of latching relation with said hook-shaped portion in the space between said bearing structure and said bracket, said strut having clearance opening therein above said bearing structure and into which the hook-shaped portion of the bracket projects in the fully assembled condition of the fender and fender shield.

2. In a fender and fender shield assembly, a fender having a wheel access opening, a fender shield closing said wheel access opening and including latching mechanism for securing the upper portion of the fender shield to the fender, said latching mechanism including a sheet metal strut mounted on the inner side of the fender shield and having an integrally struck out inwardly projecting bearing ear affording an opening in the strut above the ear, a torsion rod journalled in said bearing ear and having a latching head swingable in an arc above said ear, and a latching hook structure on the margin of the fender defining the upper portion of the wheel access opening and projecting outwardly into said opening and being engaged by said latching head but releasable by swinging of the head out of engagement therewith.

3. In a fender shield attachment structure, a latching bracket comprising a plate member adapted to be secured to the underside of a horizontal fender marginal flange, an integral outer portion of the plate member being turned up for stress-resistance engagement with the outer face of the fender adjacent to the marginal flange, and an integral outer portion of the member extending outwardly beyond said upturned portion and having an outer part thereof turned down and facing inwardly for engagement at its inner side by a latching member operable below the fender marginal flange to connect a fender shield in place on the fender.

4. In combination in a fender having a wheel access opening defined in the upper portion thereof by a fender margin including an inturned generally horizontal flange, a bracket plate having an inner portion engaging below said flange with an outer upturned portion engaging the outer face of the fender adjacent to said flange and an outwardly and downwardly extending portion outwardly beyond said upturned portion facing inwardly and engageable at its inner side by a latch on a fender shield for closing said access opening, and means securing said inner portion to said flange.

5. In combination in a fender and fender shield assembly, a fender having a wheel access opening, a fender shield closing said opening, the fender having a bracket thereon at its margin and adjacent to said wheel access opening, said bracket including an inwardly extending carrying portion, a hanger member supported upon said carrying portion and having a depending hanger eye part, the fender shield having an inwardly extending tongue-like bracket including an inner terminal hook portion disposed for detachably engaging with said hanger eye part in the closing relation of the fender shield to the access opening, and means for adjustably securing said hanger member in front to rear relation on said carrying portion to afford a snug engagement of the fender shield with the fender through the interaction of the hook portion with the eye part.

6. In combination in a bracket structure for securing a fender shield in closing relation to a wheel access opening in a fender, a bracket portion to be carried by a margin of the fender adjacent to the wheel access opening and including a hanger flange having a slot therein defining a hanger bar extremity, and a finger-like bracket portion to be carried by the fender shield for disposition adjacent to said hanger flange in the assembly of the fender shield in closing relation to the wheel access opening and comprising a flat metal strip having a hook shaped formation at one end portion arched from one face of the strip and an oblique terminal flange projecting in the opposite direction divergently relative to the opposite face of the strip and engageable cammingly over said bar for interengagement of the hanger bar within the hook.

7. In a bracket structure for attachment of a fender shield to a fender, a member to be secured to the margin of a fender, a member carried by the first mentioned member, means adjustably securing said members together in adjusted condition to position the last mentioned member in incremental spaced relation to the fender margin, said last mentioned member having an engageable downwardly extending apertured flange portion thereon, and an elongated member for attachment to the margin of a fender shield and engageable within said aperture of the engageable portion for supporting the fender shield in engagement with the fender, said adjustable securing means permitting proper installation adjustment for assuring engagement of the fender shield with the fender.

8. In a bracket structure for connecting a fender shield to a fender, an assembly including a plate attachable to the margin of a fender, a second plate carried by the first mentioned plate and having a portion thereof projecting angularly therefrom for engagement by a cooperating member on a fender shield, one of said plates having a longitudinally elongated slot therein, and a securing screw extending in securing relation through said plate including said elongated slot, said elongated slot enabling relative adjustment of the plates by loosening the screw, effecting adjustment and tightening the screw, one of said plates having a side flange thereon extending angularly thereto and cooperating with an edge of the remaining plate to hold the plates against relative turning.

9. In combination in a bracket structure for connecting a fender shield to a fender, a plate attachable to a fender, said plate having a portion projecting therefrom and including parallel side edges, a second plate carried by said first plate and having side flanges cooperating slidably with the side edges of the first plate, means securing the plates together in adjusted longitudinal relation, said second plate having a flange extending angularly from the free extremity thereof engageable by a bracket carried by a fender shield to be connected to the fender.

10. In combination in a fender and fender shield assembly, a fender having a wheel access opening, a fender shield for closing said opening, means for detachably connecting the lower end portions of the fender shield to the fender adjacent to opposite lower portions of the fender at opposite sides of the wheel access opening, a latching bracket carried by the upper margin defining the wheel access opening and extending under said margin and outwardly beyond the outer face of the fender, said bracket having an upwardly extending flange thereon engaging against the outer face of the fender and a downwardly extending flange including an inwardly facing terminal portion, and a latch member carried by the inner side of the fender shield and having a head portion movable into and out of latching engagement with said inwardly facing terminal portion of the downwardly extending bracket flange, said latch member bearing outwardly against said terminal portion to draw the fender shield inwardly toward the fender and said upwardly extending bracket flange by its engagement with the fender resisting tendency of the bracket to tilt upwardly by reason of said outward bearing of the latch member head.

11. In a fender and fender shield assembly, a fender having a wheel access opening, a fender shield for closing said wheel access opening and including latching mechanism for securing the upper portion of the fender shield to the fender, said latching mechanism including a support mounted on the inner side of the fender shield and having a bearing located in substantially spaced relation below the top of the fender shield and under the margin of the fender defining said wheel access opening, a torsion rod journaled in said bearing and having a latching head swingable in an arc above said bearing and under said fender margin to clear the fender margin in swinging of the latching head, and a latching hook structure on the margin of the fender defining the wheel access opening and projecting outwardly within the wheel access opening above said latching head and having a portion extending downwardly outwardly of the latching head engageable by the latching head at the inner side of said portion by swinging the head outwardly under the fender margin and releasable by reverse swinging of the head inwardly out of engagement with said portion.

12. In a fender and fender shield assembly, a fender having a wheel access opening, a fender shield for closing said opening, means on the lower opposite end portion of the fender shield and on the fender for supporting the fender shield in rockable relation on the fender for movement from an outwardly tilted intitial assembly position into full engagement with the outer face of the fender about said wheel access opening, and latching means on the upper portion of the fender shield and on the adjacent portion of the fender for interengagement after such full engagement of the fender shield with the fender to latch the fender shield in place under latching tension, said latching means including a bracket carried by the upper margin defining the wheel access opening in the fender and extending under and outwardly below the fender margin and including a flange portion projecting downwardly and having an engagement surface facing inwardly, said latching means also including a latch member movably supported operably by the inner side of the fender shield and located under said bracket with a bracket-engageable latching head portion movable under said bracket and the fender margin into and out of latching engagement with said inwardly facing flange portion of the bracket.

DONALD C. LUDWIG.
GEORGE W. SCHATZMAN.

REFERENCES CITED

The following references are of record in the file of this patent:

UNITED STATES PATENTS

| Number | Name | Date |
| --- | --- | --- |
| 2,238,948 | Schatzman | Apr. 22, 1941 |
| 2,239,373 | Schatzman et al. | Apr. 22, 1941 |
| 2,312,536 | Fergueson | Mar. 2, 1943 |
| 2,334,867 | Fergueson | Nov. 23, 1943 |
| 2,352,374 | Fergueson et al. | June 27, 1944 |
| 2,353,553 | Fergueson | July 11, 1944 |